United States Patent
Stankey

(10) Patent No.: US 10,241,950 B2
(45) Date of Patent: Mar. 26, 2019

(54) MULTIPATH I/O PROXY DEVICE-SPECIFIC MODULE

(71) Applicant: NetApp, Inc., Sunnyvale, CA (US)

(72) Inventor: Robert Stankey, Wichita, KS (US)

(73) Assignee: NETAPP, INC., Sunnyvale, CA (US)

(*) Notice: Subject to any disclaimer, the term of this patent is extended or adjusted under 35 U.S.C. 154(b) by 379 days.

(21) Appl. No.: 15/081,478

(22) Filed: Mar. 25, 2016

(65) Prior Publication Data

US 2017/0277646 A1 Sep. 28, 2017

(51) Int. Cl.
*G06F 13/40* (2006.01)
*G06F 9/4401* (2018.01)

(52) U.S. Cl.
CPC ........ *G06F 13/4022* (2013.01); *G06F 9/4406* (2013.01); *G06F 9/4411* (2013.01)

(58) Field of Classification Search
CPC ........ G06F 13/40; G06F 9/44; G06F 13/4022; G06F 9/4406; G06F 9/4411
See application file for complete search history.

(56) References Cited

U.S. PATENT DOCUMENTS

| | | | | |
|---|---|---|---|---|
| 6,161,152 A * | 12/2000 | Garg | ...................... | G06F 13/22 709/224 |
| 6,412,015 B1 * | 6/2002 | Navare | ............... | G06F 9/45537 709/227 |
| 8,402,124 B1 * | 3/2013 | Barillaud | .............. | G06F 9/5055 709/223 |
| 2006/0010314 A1 * | 1/2006 | Xu | ...................... | G06F 9/45545 713/2 |
| 2006/0277383 A1 * | 12/2006 | Hayden | ............... | H04L 67/1097 711/170 |
| 2015/0382042 A1 * | 12/2015 | Wagenaar | ........ | H04N 21/26258 725/34 |

* cited by examiner

*Primary Examiner* — Henry Tsai
*Assistant Examiner* — Christopher A Daley
(74) *Attorney, Agent, or Firm* — Haynes and Boone, LLP

(57) ABSTRACT

A method, non-transitory machine readable medium, and system are provided for modifying a device-specific module (DSM) corresponding to a storage device. In some embodiments, the method includes registering a first device-specific module (DSM) with a Multipath I/O (MPIO) module. The MPIO module provides one or more interfaces of the first DSM that redirect to one or more interfaces of a second DSM. The second DSM is modified to a modified second DSM. The MPIO module accesses the one or more interfaces of the first DSM and the accesses are redirected, by the one or more interfaces of the first DSM, to one or more interfaces of the modified second DSM.

20 Claims, 3 Drawing Sheets

MULTIPATH I/O PROXY DEVICE-SPECIFIC MODULE

TECHNICAL FIELD

The present description relates to data storage, more specifically, to systems, methods, and machine-readable media for updating a multipath device module corresponding to a data storage device.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with high availability.

Host computing devices may include a multipath infrastructure to simplify interoperability with storage devices and provide high availability. At the host level, the approach taken by operating system vendors may vary. However, operating systems generally are consistent in that the generic aspects of multipath management, such as virtualizing storage devices, are handled by the operating system stack. Features more specific to particular storage solutions, such as I/O routing, failover, load balancing, and other vendor-specific behavior may be implemented by plug-ins to a multipath management framework. With respect to the WINDOWS operating system from Microsoft Corporation, the multipath management framework includes Multipath I/O (MPIO) and the plug-ins include device-specific modules (DSMs).

It is advantageous to update DSMs to implement bug-fixes and/or to add new features. However, MPIO is implemented in a manner such that DSMs that are currently managing storage devices may not be modified. Accordingly, it is conventional to reboot the host computing machine and/or to remove storage devices from the host computing machine in, order to update the DSMs of the host computing machine. Removing storage devices and/or rebooting the operating system to modify DSMs is inconvenient and an inefficient use of host computing resources.

It would be advantageous to modify DSMs without having to remove storage devices and/or reboot host computing machines. Therefore, to provide optimal multipath management, a need exists for systems and techniques that more efficiently update DSMs. In particular, systems and methods that allow DSMs to be updated without requiring that storage devices be disconnected or host computing machines to be rebooted would provide a valuable improvement over conventional storage systems. Thus, while existing storage systems have been generally adequate, the techniques described herein provide improved performance and efficiency.

BRIEF DESCRIPTION OF THE DRAWINGS

The present disclosure is best understood from the following detailed description when read with the accompanying figures.

DETAILED DESCRIPTION

Figure 1:
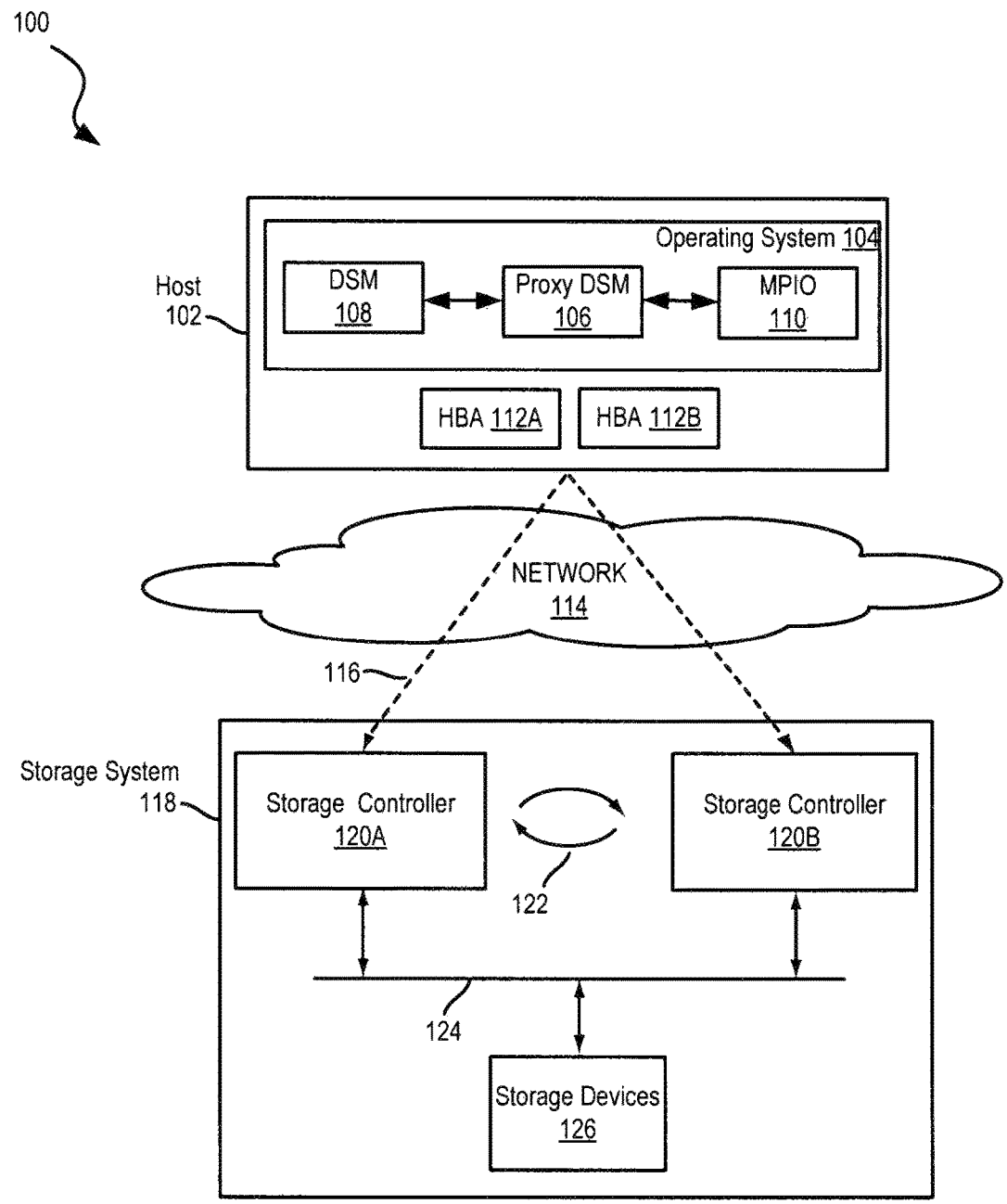
FIG. 1 is a schematic diagram of an exemplary storage architecture, according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments provide a system, method, and machine-readable medium for a host computing system to provide device-specific modules (DSMs) and proxy DSMs for one or more storage devices of a storage system. Specifically, the host computing system may provide a proxy DSM that is accessed by MPIO and that redirects communications received from MPIO to a DSM. This is beneficial for allowing the DSM to be updated while maintaining high-availability of the host computing system and the storage system.

The embodiments disclosed herein may provide several advantages. First, a host computing system that is configured to include the proxy DSM and the DSM may apply updates to the DSM without requiring a reboot. Second, a host computing system that is configured to include the proxy DSM and the DSM may apply updates to the DSM without requiring disconnection of the storage device managed by the DSM. Of course, it is understood that these features and advantages are shared among the various examples herein and that no one feature or advantage is required for any particular embodiment.

FIG. 1 is a schematic diagram of an exemplary storage architecture 100 according to aspects of the present disclosure. The storage architecture 100 includes a host 102 in communication with a storage system 118. It is understood that for clarity and ease of explanation, only a single host 102 and a single storage system 118 are illustrated, although any number of hosts 102 may be in communication with any number of storage systems 118. Furthermore, while the host 102 and storage system 118 are referred to as singular entities, a host 102 and/or storage system 118 may include any number of computing devices and may range from a single computing system to a system cluster of any size.

Each host 102 and storage system 118 includes at least one computing system that includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

The storage system 118 includes one or more storage controllers 120A and 120B in communication with the storage devices 126. The storage controllers 120A and 120B exercise low-level control over the storage devices 126 in order to execute (perform) data transactions on behalf of the host 102. In the illustrated embodiment, the storage system 118 includes two storage controllers 120A and 120B in communication with a number of storage devices 126 via a backplane 124.

In addition to data handling and processing resources, storage controllers 120A and 120B may each include a controller cache. Controller caches may be used to store data to be written to or read from the storage devices 126. The controller caches are typically much faster to access than the storage devices 126 and provide mechanisms that expedite transaction processing. The controller caches may include any volatile or non-volatile storage medium and common examples include resistive RAM (RRAM), phase-change RAM (PCRAM), flash memory (e.g., NAND/NOR flash memory), battery-backed DRAM, and/or other storage media.

Controller caches are structured to hold data before the data is written to storage 126. For example, an operation to write data to storage 126 may first write the data to a controller cache. The data may be temporarily stored in the controller cache, to allow fast access to the data by the host 102 and/or storage system 118. Data stored in cache memory is associated with storage stripes, data segments, and/or data sectors corresponding to locations of storage 126.

The first storage controller 120A may also provide the data and/or metadata to the second storage controller 120B over an inter-controller bus 122 for storing in the second controller's cache. This is referred to as mirroring, and accordingly, the inter-controller bus 122 may be referred to as a mirror channel. This duplication may take place before the data is written to the storage devices 126. In this way, the storage system 118 can recreate the transaction should either storage controller 120A or 120B fail before the write to storage is complete.

With respect to the storage system 118, the exemplary storage system 118 contains any number of storage devices 126 and responds to data transaction requests from the host 102 and/or other hosts. In some examples, the storage system 118 is structured to make the storage devices 126 appear to be directly connected (local) to the host 102.

The storage system 118 may group the storage devices 126 for speed and/or redundancy using a virtualization technique such, as RAID (Redundant Array of Independent/Inexpensive Disks). At a high level, virtualization includes mapping physical addresses of the storage devices into a virtual address space and presenting the virtual address space to the host 102. In this way, the storage system 118 represents the group of devices as a single device, often referred to as a volume. Thus, a host 102 can access the volume without concern for how it is distributed among the underlying storage devices 118.

For example, a storage controller 120A and/or 120B of the storage system 118 may be structured to store data on the storage devices 126 using a data protection scheme such as RAID 1 (mirroring), RAID 5 (striping with parity), or RAID 6 (striping with double parity). To do so, data is divided into stripes and divided again into data segments and parity segments. Each data segment and parity segment represents the portion of a stripe allocated to a particular storage device 126, and while the data segments and parity segments may have any suitable size (e.g., 64K, 128K, 256K, 512K, etc.), they are typically uniform across storage devices 126. Data segments are again divided into data sectors, which are typically uniform blocks of the data segments that are allocated to store particular data.

In various examples, the underlying storage devices 126 include hard disk drives (HDDs), solid state drives (SSDs), optical drives, and/or any other suitable volatile or non-volatile data storage medium. In some examples, the storage devices 126 include all-flash storage devices or all SSDs. In other embodiments, storage devices 126 include hybrid storage device configurations, such as by including both HDDs and SDDs.

Turning now to the host 102, host 102 includes any computing resource that is operable to exchange data with the storage system 118 by providing (initiating) data transactions with the storage system 118.

In an exemplary embodiment, a host 102 includes multiple host bus adapters (HBAs) 112A and 112B in communication with storage controllers 120A and 120B of the storage system 104. In some examples, each HBA is connected to one or more storage controllers of more than one storage system. For example, HBA 112A may be connected to storage controllers provided by multiple storage systems. Each HBA 112A and 112B provides an interface for communicating with the storage controllers 120A and 120B, and in that regard, may conform to any suitable hardware and/or software protocol. In various embodiments, the HBAs 112A and 112B include Serial Attached SCSI (SAS), iSCSI, InfiniBand, Fibre Channel and/or Fibre Channel over Ethernet (FCoE) bus adapters. Examples of other protocols include SATA, eSATA, DATA, USB, Wi-Fi and FireWire.

Communications paths between the HBAs 112A and 112B and the storage controllers 120A and 120B are referred to as links 116. A link 116 may take the form of a direct connection (e.g., a single wire or other point-to-point connection), a networked connection, or any combination thereof. Thus, in some embodiments, one or more links 116 traverse a network 114, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some embodiments, a host 102 has multiple links 116 with each storage controller for redundancy. The multiple links 116 may be provided by a single HBA (e.g., 112A) or multiple HBAs (e.g., 112A and 112B). In some embodiments, multiple links 116 operate in parallel to increase bandwidth.

To interact with (e.g., read, write, modify, etc.) remote data, a host 102 sends one or more data transactions to the respective storage system 118 via a link 116. Data transactions are requests to read, write, or otherwise access data stored within a data storage device such as the storage system 118, and may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

In the present example, the host 102 includes an operating system 104. The operating system 104 may be, for example, a WINDOWS-based operating system. Of course, the scope of embodiments is not limited to any particular operating system, and in fact may be applied to any operating system having components similar to the DSMs and MPIOs of FIGS. 1 and 2. The operating system 104 may further include a Multipath I/O (MPIO) 110 management framework that is structured to provide multiple paths to one or more storage systems and/or storage devices. Paths may include, for example, iSCSI or Fibre Channel, connections between host 102 ports and storage system 118 ports. Paths may include, for example, identifications corresponding to particular components of the storage system 100. For example, a path may identify HBAs (e.g., HBA 112A and/or 112B), particular links (e.g., link 116), and particular storage controllers (e.g., storage controller 120A and/or 120B) and/or particular storage devices (e.g., one or more storage devices of the storage devices 126).

In the present example, MPIO 110 is structured as one or more software drivers that manage multiple paths between the host 102 and the storage system 118. The operating system 104 is further configured with at least one device-specific module (DSM) 108 and at least one proxy DSM 106. In some examples, the DSM 108 and proxy DSM 106 are structured as dynamically-loadable kernel modules. In the present example, the DSM 108 is structured as one or more software drivers that are configured to identify particular paths and to manage path failure and recovery corresponding to one or more storage devices. For example, the DSM 108 may identify a path to a Logical Unit Number (LUN) corresponding to the storage devices 126 that are associated with the storage system 118. In the event of a failure of a path, the DSM 108 may identify an alternate path to the LUN corresponding to the storage devices 126.

The proxy DSM 106 is structured to route communications from MPIO 110 to DSM 108 and from DSM 108 to MPIO 110. In some examples, proxy DSM 106 is structured to include one or more functions that receive data from MPIO 110 and forward the received data to DSM 108 for processing. Similarly, proxy DSM 106 may receive data from DSM 108 and forward the received data to MPIO 110. Accordingly, proxy DSM 106 allows for an indirect communicative coupling of DSM 108 and MPIO 110.

Figure 2:
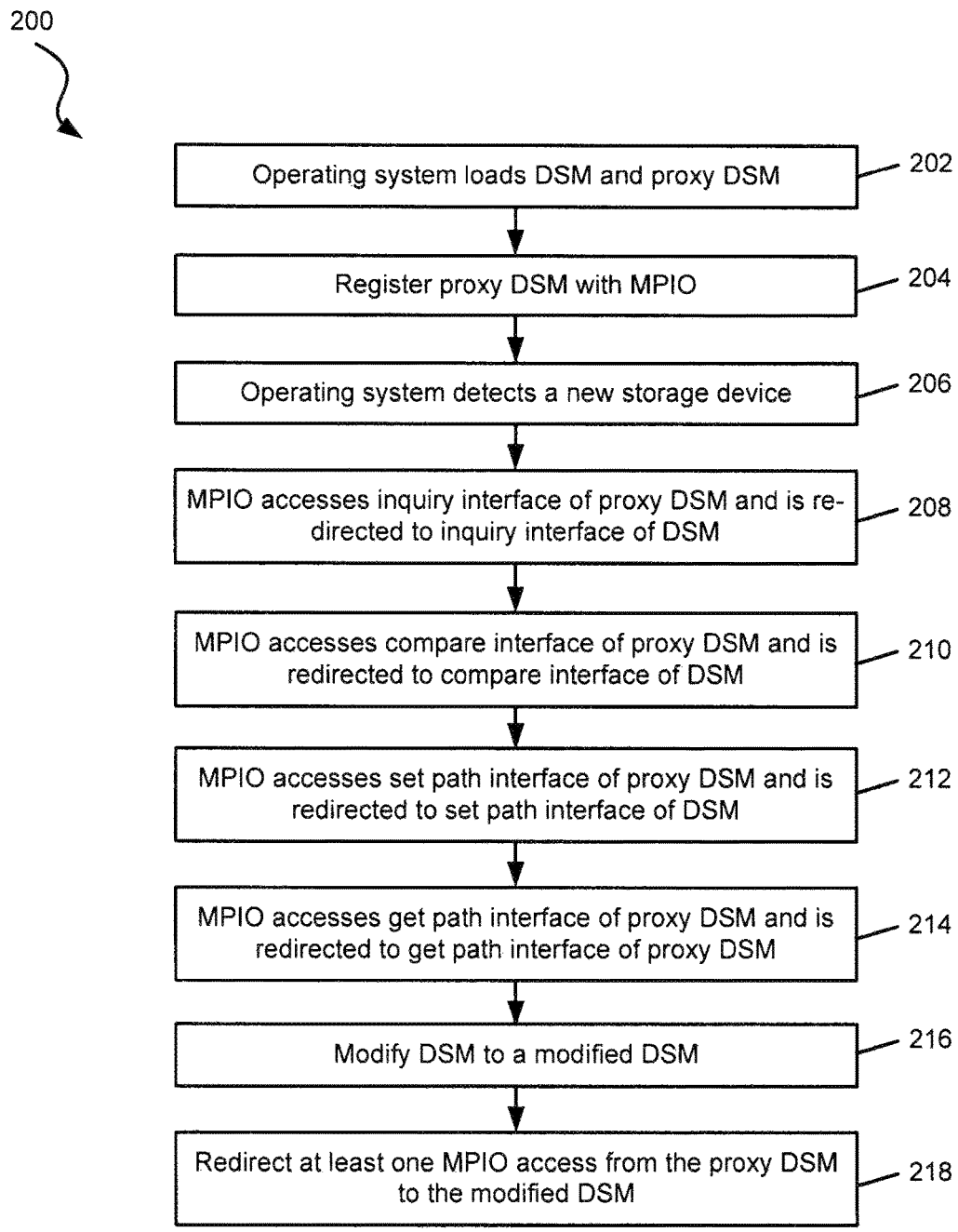
FIG. 2 is a flow diagram of a method for modifying a device-specific module, according to aspects of the present disclosure.

FIG. 2 is a flow diagram illustrating a method for modifying a device-specific module, according to some examples of the present disclosure. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method 200, and some of the steps described can be replaced, eliminated and/or re-ordered for other embodiments of the method 200.

At action 202, during an operating system boot process, the operating system (e.g., operating system 104) loads a device specific module (DSM) (e.g., DSM 108) and a corresponding proxy DSM (e.g., proxy DSM 106). In some examples, the DSM and the proxy DSM are each structured as drivers that are loaded into a kernel of the operating system. Accordingly, loading of the DSM and the proxy DSM may include allocating memory corresponding to the kernel and storing code and/or data corresponding to the DSM and the proxy DSM in the allocated memory.

In the present example, the DSM and the proxy DSM each include a set of interfaces that are registered with the operating system. Once the interfaces of the proxy DSM are registered with the operating system, the operating system notifies the proxy DSM. Similarly, once the interfaces of the DSM are registered with the operating system, the operating system notifies the DSM. In some examples, the notifying is performed by calling a notification interface corresponding to the proxy DSM and another notification interface corresponding to the DSM. For example, once the operating system has loaded the proxy DSM and registered the interfaces of the proxy DSM, the notification interface of the proxy DSM may be used to notify the proxy DSM that the proxy DSM has been loaded and its interfaces registered. Similarly, once the operating system has loaded the DSM and registered the interfaces of the DSM, the notification interface of the DSM may be used to notify the DSM that the proxy DSM has been loaded and its interfaces registered.

At action 204, after the proxy DSM has been notified that its interfaces are registered with the operating system, the proxy DSM registers with MPIO. In the present example, the proxy DSM registers with MPIO after the interfaces of the DSM have been registered by the operating system. Accordingly, once the proxy DSM is notified that its interfaces are registered by the operating system, the proxy DSM may delay registering with MPIO until after the interfaces of the DSM have been registered with the operating system. In some examples, the proxy DSM delays registering with MPIO until after the interfaces of the DSM are registered with the operating system because MPIO may immediately attempt to communicate with the proxy DSM as soon as the proxy DSM is registered with MPIO. Accordingly, delaying the registering of the proxy DSM with MPIO until the interfaces of the DSM are registered with the operating system may allow the proxy DSM to redirect the communications from MPIO to the DSM.

In the present example, the proxy DSM is configured to route communications to and from MPIO and the DSM. Accordingly, the DSM does not register with MPIO so that MPIO is not aware of the DSM and does not attempt to communicate with the DSM directly. Thus, MPIO communicates with the DSM indirectly via the proxy DSM that is registered with MPIO.

At action 206, an operating system discovery process detects that there is a new storage device. In the present example, the new storage device is detected after loading one or more DSMs and/or proxy DSMs. In some examples, the operating system detects the new storage device when a storage system connects to a network and sends a signal onto the network that is received by a host bus adapter of a host. The host bus adapter then passes the signal to the host's operating system, which receives the signal sent from the host bus adapter.

The operating system may issue commands to the new storage device via the storage system to collect information such as a LUN and/or vendor product identifier corresponding to the new storage device. This information may be cached by the operating system for future use. The operating system then notifies MPIO that the new storage device has been detected and may provide the collected information to MPIO. In some examples, a vendor product identifier includes all of or a portion of a World Wide Name (WWN) assigned to the storage device.

At action 208, MPIO accesses an inquiry interface of the proxy DSM. In some examples, MPIO maintains a list of one or more proxy DSMs and/or DSMs. The list may be ordered based on an order in which the proxy DSMs and/or DSMs registered with MPIO. When a new storage device is detected, MPIO may iterate through the list, starting with the first proxy DSM/DSM registered. For each proxy DSM/DSM, MPIO may access the inquiry interface of the proxy DSM/DSM to communicate the vendor product identifier to the proxy DSM/DSM. Accordingly, MPIO provides the vendor product identifier to the inquiry interface of the proxy DSM.

The inquiry interface of the proxy DSM receives the vendor product identifier from MPIO and accesses an inquiry interface of the DSM. The proxy DSM provides the vendor product identifier to the DSM. Accordingly, the inquiry access by the MPIO is redirected from the proxy DSM to the DSM. The inquiry interface of the DSM attempts to match the received vendor product identifier with one or more vendor product identifiers that are stored in a data structure (e.g., a list) by the DSM.

If the received vendor product identifier matches one of the DSM's vendor product identifiers, the DSM returns a status to the proxy DSM that indicates that the DSM is a manager of the storage device. In addition, the DSM may also return a unique identifier that may be used to access the storage device. In some examples, the unique identifier includes a memory address corresponding to the storage device. Based on the proxy DSM receiving the indicating from the DSM that the DSM is the manager of the storage device, the proxy DSM then, responds to MPIO with a status that indicates that the proxy DSM is a manager of the storage device. The proxy DSM provides MPIO with the unique identifier received from the DSM.

Otherwise, if the received product identifier does not match one of the DSM's vendor product identifiers, the DSM returns a status to the proxy DSM that indicates that the DSM is not a manager of the storage device and does not provide a unique identifier to the proxy DSM. The proxy DSM then responds to MPIO with a status that indicates that the proxy DSM is not a manager of the storage device and does not return a unique identifier to MPIO.

In the present example, once MPIO has accessed the inquiry interface of each proxy DSM and/or DSM that is registered, MPIO has a set of one or more proxy DSMs/DSMs that are identified as managers of the storage device and a set of unique identifiers received from the proxy DSMs/DSMs.

At action 210, MPIO iterates through the proxy DSMs and/or DSMs that identified themselves as managers of the storage device to access the compare interfaces of the proxy DSMs and/or DSMs. In some examples, the iteration includes listing the proxy DSMs and/or DSMs, and accessing a compare interface of each proxy DSM and/or DSM in the list according to the ordering of the proxy DSMs and/or DSMs in the list. In some examples, the ordering corresponds to an order in which the proxy DSMs and/or DSMs identified themselves as managers of the storage device.

To access the compare interfaces, MPIO sends to each of the compare interfaces of the proxy DSMs and/or DSMs two or more of the unique identifiers received from the inquiry interfaces of the proxy DSMs and/or DSMs. MPIO may iterate through each combination of pairs of unique identifiers, sending the pairs to the compare interfaces until all of the combinations have been sent to the compare interfaces of the proxy DSMs and/or DSMs. As an example, when the compare interface of the proxy DSM is accessed by MPIO, the proxy DSM receives a pair of unique identifiers from MPIO and accesses a compare interface of the DSM. The proxy DSM communicates the pair of unique identifiers to the compare interface of the DSM. The DSM determines whether the pair of unique identifiers are a match and communicates the determination to the proxy DSM. In some examples, the identifiers are compared using a binary comparison. The proxy DSM and receives from the DSM the communication indicating whether the pair of unique identifiers is a match. The proxy DSM returns the indicator regarding the match to MPIO.

Based on the match indicators received by MPIO from the compare interfaces, the MPIO associates proxy DSMs/DSMs with virtual devices created by MPIO. A proxy DSM and/or DSM may be associated with each virtual device. For example, for the new storage device, MPIO may create a virtual device that is associated with the proxy DSM. Accordingly, in this step, MPIO determines relationships between the virtual devices and the proxy DSMs/DSMs, such that MPIO may route accesses of the virtual devices to their associated proxy DSMs and/or DSMs.

At action 212, MPIO accesses a set path interface of the proxy DSM and provides to the proxy DSM a default path identifier. In some examples, the default path identifier corresponds to an HBA (e.g., HBA 112A). The proxy DSM accesses a set path interface of the DSM to provide the default path identifier to the DSM. The DSM stores the default path identifier received from the proxy DSM.

In some examples, a switch or other network device may provide additional paths to a storage device. These additional paths may be stored by the DSM. Accordingly, to exercise all of the paths, the DSM may determine an appropriate path identifier that is different from the default path identifier received from MPIO. Responsive to the set path interface of the DSM being accessed, the DSM may return the determined path identifier to the proxy DSM. The proxy DSM may then pass the path identifier to MPIO so that MPIO may replace the default path identifier with the path identifier received from the proxy DSM.

At action 214, responsive to a device access request received by MPIO, MPIO accesses a get path interface of the proxy DSM. For example, MPIO may receive an access request to access a virtual device that corresponds to a proxy DSM and/or DSM. Accordingly, MPIO may then access a get path, interface of a corresponding proxy DSM. In some examples, the device access request includes the unique identifier generated by the inquiry interface in step 208. This unique identifier may be passed by MPIO to the get path interface of the proxy DSM. In some examples, MPIO may provide one or more parameters to the get path interface of the proxy DSM.

The get path interface of the proxy DSM accesses the get, path interface of the DSM. In some examples, the get path interface of the proxy DSM provides to the get path interface of the DSM the unique identifier and the one or more parameters.

The DSM performs processing to determine a path identifier. For example, the DSM may return a first path identifier as a default path, unless a received parameter indicates that an alternate path identifier should be provided. The DSM provides the determined path to the proxy DSM, which returns the determined path to MPIO. Accordingly, MPIO receives a path identifier that may be used to route I/O to the storage device. In some examples, the DSM includes one or more algorithms to provide features such as a load balancing, failover, or other features that may be processed to determine which path identifier to provide to MPIO by way of the proxy DSM.

While the above interfaces provide some examples of interfaces that may be provided by proxy DSMs and DSMs, these are merely some examples of the many interfaces that may be provided by proxy DSMs and/or DSMs.

At action 216, the DSM is modified with one or more updates. In some examples, bug-fixes and/or new features may be implemented in the code and/or data of the DSM. For example, an interface such as the get path interface of the DSM may be updated to provide a more efficient algorithm for determining a path identifier. In some examples, the DSM may be modified to a modified DSM before and/or after any of the actions described with respect to FIG. 2.

In the present example, the modifying of the DSM may include changing a portion of the code and/or data of the DSM. In some examples, the DSM is removed in its entirety and replaced by the modified DSM. For example, the DSM may be unloaded from the kernel and the modified. DSM may be loaded into the kernel. In other examples, portions of the DSM are replaced by modified code and/or data and other portions are maintained in the memory without being replaced. For example, the DSM may be modified without removing data stored by the DSM, such as path identifiers. Accordingly, the data that is maintained, such as path identifiers, may be accessed by the modified DSM.

Because the DSM is indirectly communicatively coupled with MPIO via the proxy DSM, the DSM may be modified without the host requiring a reboot or the storage device being disconnected from the host. In some examples, while the DSM is being modified, the proxy DSM may delay processing of requests received from MPIO until the modified DSM is loaded and registered with the operating system. Once the modified DSM is loaded and registered, the proxy DSM may resume communications between MPIO and the DSM.

At action 218, MPIO accesses one or more interfaces of the proxy DSM, such as the get path interface of the proxy DSM. The proxy DSM accesses the modified DSM to redirect the accesses by MPIO to the modified DSM. The proxy DSM may also receive responses from the modified DSM that are provided to MPIO.

As will be recognized, the method 200 provides an improved multipath I/O access technique that addresses a technical challenge particular to networked storage systems. In some embodiments, this improved multipath I/O access technique allows for providing greater availability of the host and/or storage systems. For example, by allowing DSMs to be updated without removing storage devices from the host or rebooting the host, the host may remain available for access. The present technique addresses challenges provided by conventional storage system techniques and thereby provides significant improvements over these conventional storage system techniques.

In various embodiments, the improved multipath I/O technique is performed by using various combinations of dedicated, fixed-function computing elements and programmable computing elements executing software instructions. Accordingly, it is understood that any of the steps of method 200 may be implemented by a computing system using corresponding instructions stored on or in a non-transitory computer readable medium accessible by the processing system. For the purposes of this description, a tangible computer-usable or computer readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Figure 3:
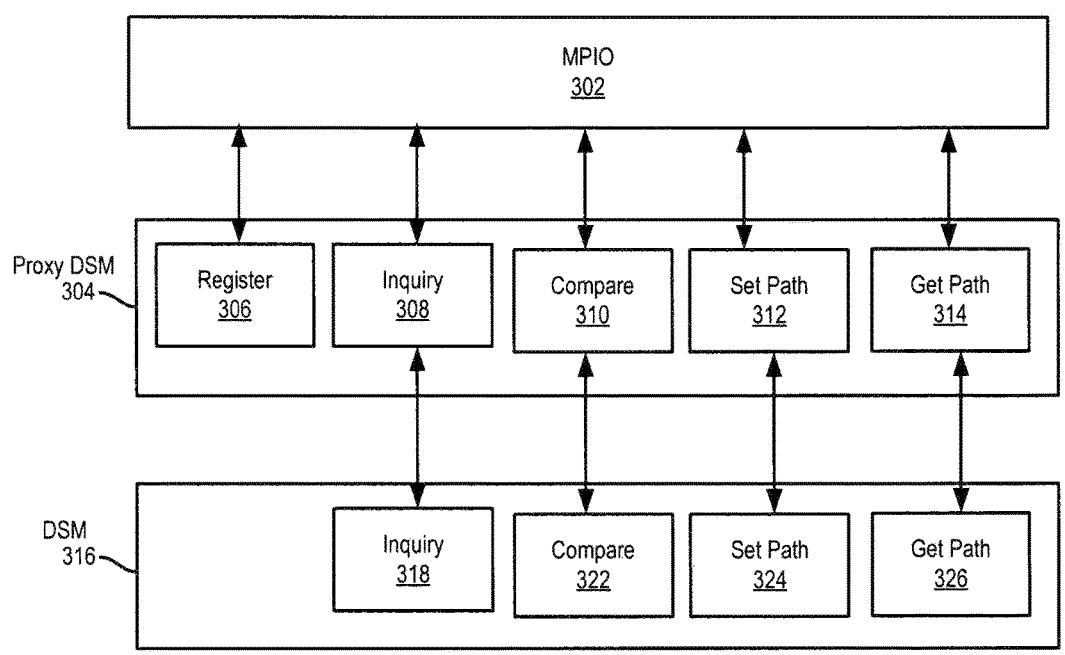
FIG. 3 is a schematic diagram of interfaces provided by a proxy device-specific module that act as a proxy for interfaces of a device-specific module, according to aspects of the present disclosure.

FIG. 3 is schematic diagram of interfaces provided by a proxy device-specific module 304 that provide MPIO 302 with access to interfaces of a device-specific module 316, according to aspects of the present disclosure.

MPIO 302 includes a framework that provides multipath I/O functionality. In the present example, this may include providing a plurality of virtual devices that, may be accessed to perform I/O with one or more physical devices. In some examples, MPIO 302 is configured as one or more device drivers that are installed in an operating system kernel to provide the multipath I/O functionality.

To provide a path to each physical device, MPIO 302 is configured to access device-specific modules (DSMs), which may be structured as vendor-provided device drivers that are configured to be associated with physical devices.

A proxy DSM 304 is provided that routes access requests from MPIO 302 to DSM 316, and routes responses to the access requests from DSM 316 to MPIO 302. The proxy DSM 304 operates as a redirection layer that passes data between MPIO 302 and DSM 316. For example, requests received by interfaces of the proxy DSM 304 may be routed to interfaces of the DSM 316, and responses received at the proxy DSM 304 from the interfaces of the DSM 316 may be routed to MPIO 302.

In addition, the proxy DSM 304 includes a register interface 306 that registers the proxy DSM 304 with MPIO 302 to receive access requests from MPIO 302. The proxy DSM 304 may include other interfaces in addition to those shown, and in other examples interfaces may be modified or omitted. In the present examples, the interfaces include an inquiry interface 308 that is a proxy for the DSM's inquiry interface 318, a compare interface 310 that is a proxy for the DSM's compare interface 322, a set path interface 312 that is a proxy for the DSM's set path interface 324, and a get path interface 314 that is a proxy for the DSM's get path interface 326.

In some examples, the interfaces are structured as functions that may be called by external modules. For example, the functions provided by the proxy DSM 304 may be called by MPIO 302, and the functions provided by DSM 316 may be called by proxy DSM 304.

In the present example, the inquiry interface 318 is structured to determine a unique identifier corresponding to a particular device and return the unique identifier to the inquiry interface 308, which returns the unique identifier to MPIO 302. The compare interface 322 is structured to determine matches between unique identifiers and return a Boolean value to the compare interface 310, which returns the Boolean value to MPIO 302. The set path interface 312 is structured to receive a path identifier and store the path identifier. The get path interface 326 is structured to determine a path identifier from among one or more stored path identifiers and return the path identifier to the get path interface 314, which returns the path identifier to MPIO 302. The DSM 316 may include other interfaces in addition to those shown, and in other examples interfaces may be modified or omitted.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
redirecting, by an interface of a proxy device-specific module (DSM), a first access from a Multipath I/O (MPIO) module, wherein the first access is redirected to an interface of a first DSM different from the proxy DSM, and wherein redirecting the first access includes transmitting a first identifier from the proxy DSM to the first DSM;
modifying the first DSM to a modified DSM; and
redirecting, by the interface of the proxy DSM, a second access from the MPIO module, wherein the second access is redirected to an interface of the modified DSM, and wherein redirecting the second access includes transmitting a second identifier from the proxy DSM to the MPIO module.

2. The method of claim 1, wherein modifying the first DSM comprises performing at least one modification selected from the group consisting of: replacing the first DSM with the modified DSM; unloading the first DSM from a kernel and loading the modified DSM into the kernel; and replacing a portion of the first DSM with modified code.

3. The method of claim 1, further comprising:
loading, by a host computing system during a boot process, the proxy DSM and the first DSM, wherein the first DSM is loaded prior to registering the proxy DSM with the MPIO module.

4. The method of claim 1, wherein the first DSM is modified to the modified DSM without rebooting a host computing system.

5. The method of claim 1, wherein the first DSM provides a path identifier corresponding to a storage device, and wherein the storage device is not removed from a host computing system between redirecting the first access to the first DSM and redirecting the second access to the modified DSM.

6. The method of claim 1, wherein the first DSM includes a first device driver corresponding to a storage device, and wherein the modified DSM includes a modified device driver corresponding to the storage device.

7. The method of claim 1, wherein the proxy DSM comprises a dynamically-loadable kernel module.

8. The method of claim 1, wherein the interface of the proxy DSM redirects to
an inquiry interface of the DSM, wherein the inquiry interface of the DSM matches an identifier of a storage device with a stored identifier.

9. A non-transitory machine readable medium having stored thereon instructions for performing a method comprising machine executable code which when executed by at least one machine, causes the machine to:
register a proxy device-specific module (DSM) with a Multipath I/O (MPIO) module;
send a first identifier from the MPIO module to the proxy DSM;
provide the first identifier from the proxy DSM to a first DSM different from the proxy DSM;
modify the first DSM to a modified DSM;
provide a second identifier from the modified DSM to the proxy DSM; and
send the second identifier from the proxy DSM to the MPIO module.

10. The non-transitory machine readable medium of claim 9, wherein modifying the DSM comprises performing at least one modification selected from the group consisting of: replacing the first DSM with the modified DSM; unloading the first DSM from a kernel and loading the modified DSM into the kernel; and replacing a portion of the first DSM with modified code.

11. The non-transitory machine readable medium of claim 9, having further machine executable code that causes the machine to:
load, during a boot process, the proxy DSM and the first DSM, wherein the first DSM is loaded prior to registering the proxy DSM with MPIO.

12. The non-transitory machine readable medium of claim 9, wherein the machine is not rebooted between sending the first identifier and sending the second identifier.

13. The non-transitory machine readable medium of claim 9, wherein the first DSM comprises a dynamically-loadable kernel module.

14. The non-transitory machine readable medium of claim 9, wherein the first DSM includes a first device driver corresponding to a storage device, and wherein the modified DSM includes a modified device driver corresponding to the storage device.

15. The non-transitory machine readable medium of claim 9, wherein the proxy DSM includes an inquiry interface.

16. A computing device comprising:
a memory containing machine readable medium comprising machine executable code having stored thereon instructions for performing a method of modifying a device-specific module (DSM);
a processor coupled to the memory, the processor configured to execute the machine executable code to cause the processor to:
provide, to a Multipath I/O (MPIO) module, an interface of a first device-specific module (DSM) that redirect to an interface of a second DSM;
redirect, by the interface of the first DSM, a first access of the MPIO module to the second DSM, and wherein redirecting the first access includes transmitting a first identifier from the first DSM to the second DSM;
modify the second DSM to a modified second DSM;
access, by the MPIO module, the interface of the first DSM; and
redirect, by the interface of the first DSM, a second access of the MPIO module to the modified second DSM, and wherein redirecting the second access includes transmitting a second identifier from the first DSM to the MPIO module.

17. The computing device of claim 16, wherein modifying the second DSM comprises performing at least one modification selected from the group consisting of: replacing the second DSM with the modified second DSM; unloading the second DSM from a kernel and loading the modified second DSM into the kernel; and replacing a portion of the second DSM with modified code.

18. The computing device of claim 16, the processor further configured to:
load, during a boot process, the first DSM and the second DSM, wherein the second DSM is loaded prior to registering the first DSM with the MPIO module.

19. The computing device of claim 16, wherein the computing device is not rebooted between redirecting the first access to the second DSM and redirecting the second access to the modified second DSM.

20. The computing device of claim 16, wherein the first DSM comprises a dynamically-loadable kernel module.

* * * * *